W. T. JENKS.
Street-Cars.

No. 135,277.  Patented Jan. 28, 1873.

Witnesses:
John Becker
C. Sedgwick

Inventor:
W. T. Jenks
per
Attorneys.

AM. PHOTO-LITHOGRAPHIC CO. N.Y. (OSBORNE'S PROCESS)

UNITED STATES PATENT OFFICE.

WILLIAM T. JENKS, OF TOLEDO, OHIO.

IMPROVEMENT IN STREET-CARS.

Specification forming part of Letters Patent No. 135,277, dated January 28, 1873.

*To all whom it may concern:*

Be it known that I, WILLIAM T. JENKS, of Toledo, in the county of Lucas and State of Ohio, have invented a new and useful Improvement in Street Rail-Cars, of which the following is a specification:

The object of this invention is to so construct the cars of street railroads that the body of the car may be reversed without the use of a turn-table and without detaching the horses; and it consists in the construction and arrangement of parts hereinafter described.

Figure 1:
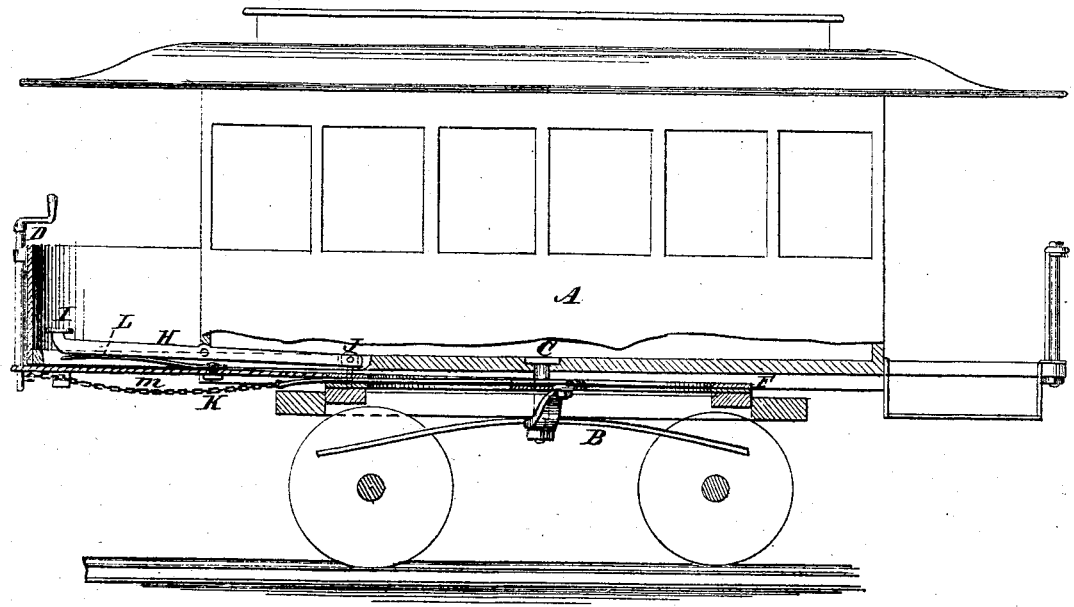
Figure 2:
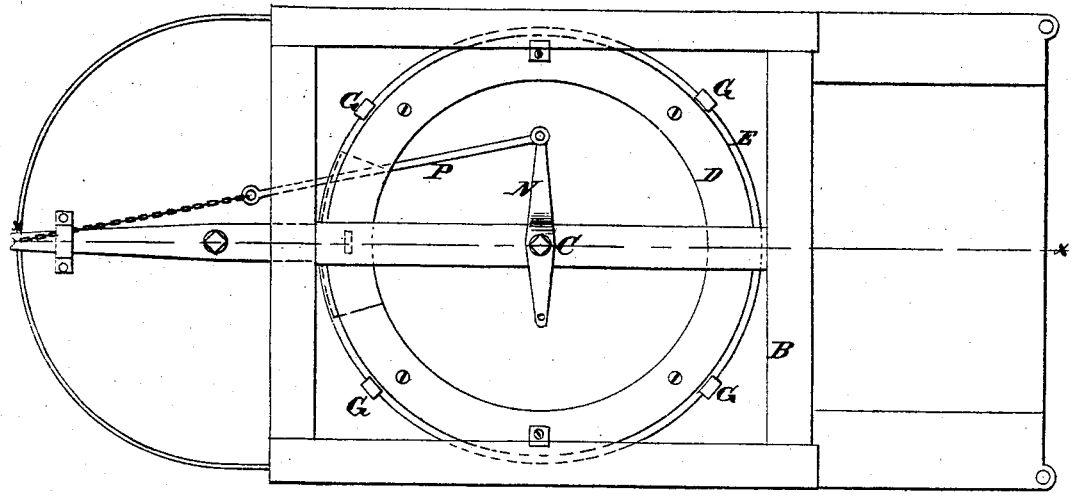
Figure 3:
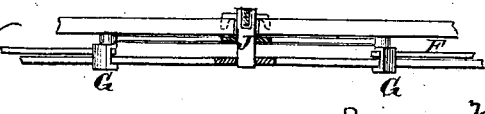

In the accompanying drawing, Figure 1 represents a vertical longitudinal section of the car taken on the line $x$ $x$ of Fig. 2. Fig. 2 is a plan view, showing the reverse or under side of the car. Fig. 3 is a detail, showing the arrangement of the stop-lever and the parts connected therewith.

Similar letters of reference indicate corresponding parts.

A is the body of the car. B is the truck. C is the king-bolt, by which the body and the truck are connected, and which is the central or turning point when the body is reversed. D is a wheel rigidly attached to the top of the frame of the truck, in the center of which is the king-bolt C. This wheel is made in two parts, or with a projecting flange, E, on its rim. On the bottom of the car is a wheel, F, of corresponding diameter. G represents hooks attached to the bottom of the car, which hook over the projecting flange E and hold the two wheels in contact, the wheel D being the foundation upon which the body rests, and the king-bolt the center upon which it turns. H is a spring-lever arranged on the front platform of the car, having a foot-piece, I, at its front end and a stop-pin, J, at the back end. K is the fulcrum, and L is the spring which bears upward against the forward end of the lever with a constant pressure, and consequently throws the pin J down, so that it engages with holes in the wheel D when either end of the body is in the proper position. To reverse the car, all the driver has to do is to bear with his foot upon the foot-piece I, while he turns his horse round half a revolution to the other end of the truck. This action reverses the car, the team or horse being attached to end of the draft-bar M which is fast to the bottom of the car. N is the brake-lever which is connected to the king-bolt as a fulcrum.

I do not confine myself to any particular kind of brake, as almost any of the ordinary brakes may be applied by the means of this lever.

This lever is connected with the chain-shaft O by the loose rod or bar P. To allow this rod to pass, the wheel F of the body is cut away a sufficient space to allow the body to be reversed without disarranging the bar or interfering with the proper working of the brake-lever.

The advantages over the ordinary street-car are, the driver always occupies the same platform and the same position in regard to the fare-box, and the heavy expense of a turn-table is avoided.

Having thus described my invention, I claim as new and desire to secure by Letters Patent—

A spring-lever, H, having foot-piece I on platform and stop-pin J at the back end, combined with a car pivoted to its truck, as described, to enable driver to lock or unlock the said car and truck, and then turn the former on the latter by means of his horses, as set forth.

WILLIAM T. JENKS.

Witnesses:
JOHN VAN GUNTON,
D. E. MERRILL.